United States Patent
Bauman

(10) Patent No.: US 11,166,402 B2
(45) Date of Patent: Nov. 9, 2021

(54) TILLAGE APPARATUS, SYSTEMS, AND METHODS

(71) Applicant: Benjamin L. Bauman, Eureka, IL (US)

(72) Inventor: Benjamin L. Bauman, Eureka, IL (US)

(*) Notice: Subject to any disclaimer, the term of this patent is extended or adjusted under 35 U.S.C. 154(b) by 116 days.

(21) Appl. No.: 16/192,765

(22) Filed: Nov. 15, 2018

(65) Prior Publication Data

US 2019/0159396 A1    May 30, 2019

Related U.S. Application Data

(60) Provisional application No. 62/586,531, filed on Nov. 15, 2017.

(51) Int. Cl.
| | |
|---|---|
| *A01B 63/32* | (2006.01) |
| *A01B 63/22* | (2006.01) |
| *A01B 33/08* | (2006.01) |
| *A01B 5/04* | (2006.01) |

(52) U.S. Cl.
CPC ........... *A01B 63/22* (2013.01); *A01B 33/087* (2013.01); *A01B 63/32* (2013.01); *A01B 5/04* (2013.01)

(58) Field of Classification Search
CPC ..... A01B 63/32; A01B 63/111; A01B 63/114; A01B 33/087; A01B 63/22; A01B 5/04; A01C 7/205; A01C 7/203
USPC .......................................................... 172/4
See application file for complete search history.

(56) References Cited

U.S. PATENT DOCUMENTS

| | | | | |
|---|---|---|---|---|
| 3,630,290 | A * | 12/1971 | Williams et al. ...... | A01B 63/22 172/7 |
| 3,642,073 | A * | 2/1972 | Geurts .................... | A01B 59/00 172/140 |
| 5,479,992 | A * | 1/1996 | Bassett ................. | A01B 63/114 111/134 |
| 5,954,139 | A * | 9/1999 | Forsyth .................. | A01C 7/208 172/260.5 |
| 6,698,523 | B2 * | 3/2004 | Barber ................... | A01B 63/22 172/239 |
| 6,827,029 | B1 * | 12/2004 | Wendte .................. | A01C 7/042 111/185 |
| 7,866,410 | B2 * | 1/2011 | Ryder et al. ........... | A01C 7/203 172/239 |
| 8,448,717 | B2 * | 5/2013 | Adams et al. ......... | A01C 7/203 172/4 |
| 8,634,992 | B2 * | 1/2014 | Sauder et al. ......... | A01C 7/205 701/50 |
| 8,985,232 | B2 * | 3/2015 | Bassett .................. | A01C 7/205 111/135 |

(Continued)

*Primary Examiner* — Thomas B Will
*Assistant Examiner* — Joel F. Mitchell
(74) *Attorney, Agent, or Firm* — Todd R. Fronek; Larkin Hoffman Daly & Lindgren, Ltd.

(57) ABSTRACT

A tillage control system for a plurality of row units having an implement and being connected to a frame. The system includes a hydraulic system having fluid, a supply port and a drain port. A plurality of control subsystems are fluidly coupled with the supply port and the drain port. Each control subsystem is coupled with one of the plurality of row units and include a control valve and an actuator fluidly coupled to the control valve. The system further includes a controller communicatively coupled with each of the control valves to independently operate each actuator to raise and lower each implement of the plurality of row units relative to the frame.

13 Claims, 14 Drawing Sheets

(56) References Cited

U.S. PATENT DOCUMENTS

| | | | | |
|---|---|---|---|---|
| 9,215,838 B2* | 12/2015 | Bassett | ............... | A01B 49/06 |
| 9,288,937 B2* | 3/2016 | Sauder et al. | ....... | A01B 63/114 |
| 9,301,439 B2* | 4/2016 | Gilstring | ............. | A01B 49/027 |
| 9,795,077 B2* | 10/2017 | Hahn et al. | ............. | A01C 5/068 |
| 2010/0319941 A1* | 12/2010 | Peterson | ............. | A01B 79/005 |
| | | | | 172/1 |
| 2018/0146609 A1* | 5/2018 | Andrews | ................ | A01C 7/201 |

* cited by examiner

TILLAGE APPARATUS, SYSTEMS, AND METHODS

BACKGROUND

Tillage tools such as cultivators are used in farming operations to work (e.g., till, cultivate, rip, etc.) soil. Some such cultivators include a plurality of cultivator row units disposed along the width of one or more frames.

DESCRIPTION

Figure 1:
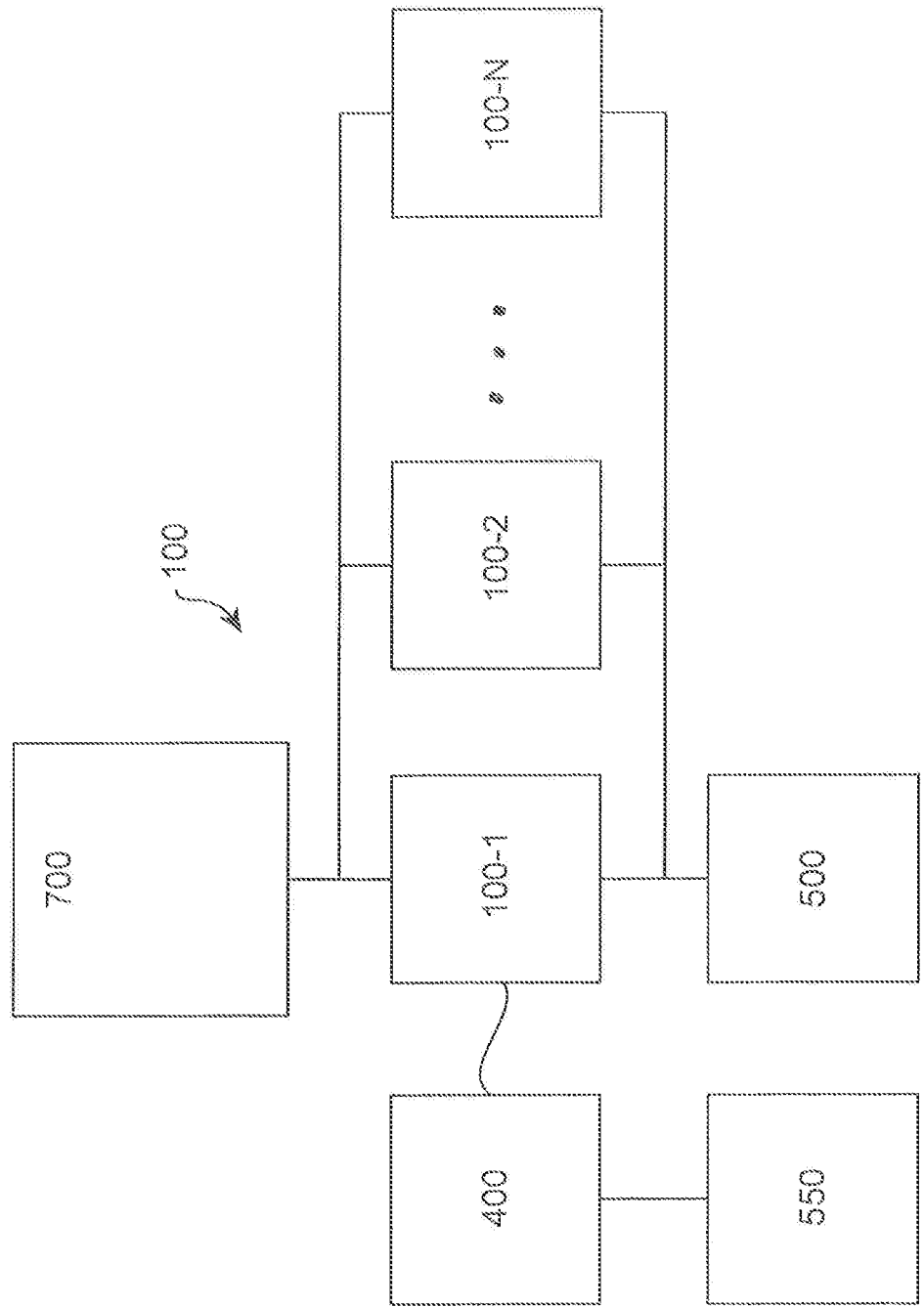
FIG. 1 is a schematic block diagram of an embodiment of a control system.

Referring to the drawings, wherein like reference numerals designate identical or corresponding parts throughout the several views, FIG. 1 schematically illustrates a control system 700 for selectively raising and lowering individual row units of a tillage tool (e.g., a cultivator). The control system 700 optionally includes a plurality of control subsystems 100, each subsystem being configured to alternately raise and lower one or more row units (e.g., cultivator row units 200 as described below). As illustrated, any number of control unit subsystems 100-1, 100-2, . . . 100-N may be incorporated in the control system 700.

Figure 2:
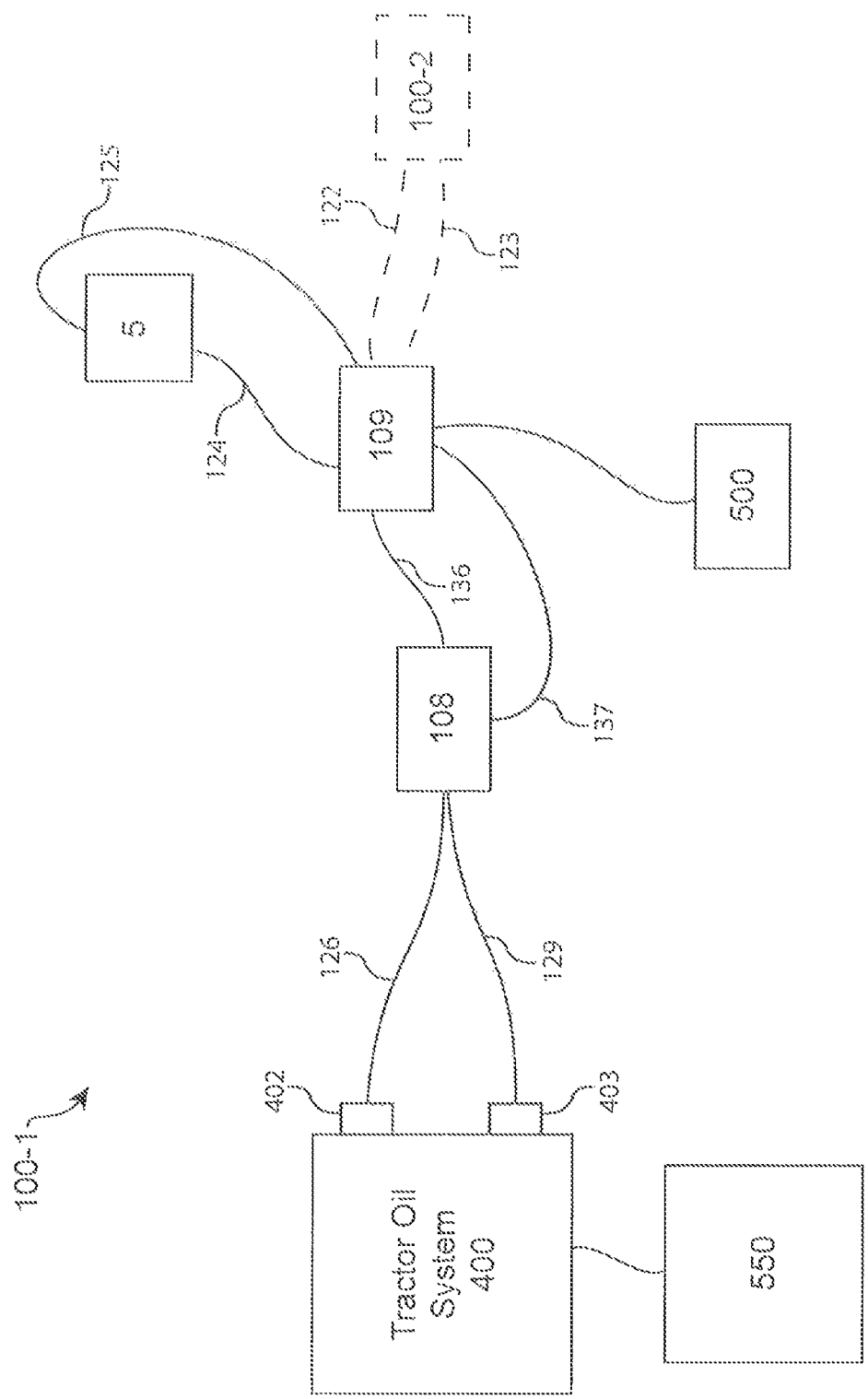
FIG. 2 is a schematic block diagram of an embodiment of a control subsystem for raising and lowering a row unit.

As schematically illustrated in FIG. 2, an example row unit control subsystem 100-1 optionally includes an actuator 5 (e.g., a hydraulic actuator such as a dual-acting hydraulic actuator) disposed to raise and lower one or more row units as described in more detail below. Subsystems 100-2 through 100-N are similar in construction to subsystem 100-1. Each actuator 5 is optionally in fluid communication with a control valve 109 (e.g., directional control valve, flow control valve, two-position control valve, three-position control valve, etc.), optionally via a manifold 108. Each valve and/or manifold is optionally supported on a toolbar and/or on a row unit as discussed below.

Each control valve 109 is optionally in fluid communication with a hydraulic system 400, e.g., through a fluid supply port 402 and a fluid drain port 403 thereof. In some embodiments, the control valve 109 has a plurality of positions: (1) a first position in which the actuator 5 is extended (e.g., to raise one or more row units), (2) a second position in which the actuator 5 is retracted (e.g., to lower one or more row units), and (3) a third position in which no oil flows through the control valve 109.

In some embodiments, a plurality of control subsystems 100 are fluidly coupled in series. One of the subsystems (e.g., subsystem 100-1) is fluidly coupled to the hydraulic system 400, and each other subsystem 100 is fluidly coupled to one or more subsystems (e.g., neighboring subsystems and/or subsystems on neighboring row units).

Referring to the illustrated subsystem 100-1 in more detail, in the illustrated embodiment, the supply port 402 is optionally in fluid communication with first manifold 108 of subsystem 100-1 (e.g., via a coupling 126). The manifold 108 optionally places the oil supply port 402 with a pressure port of the control valve 109 (e.g., via a coupling 136). In various positions of the control valve 109, the valve 109 alternately supplies oil from the oil supply port 402 to (1) a head end of the actuator 5 via a coupling 125 or (2) a rod end of the actuator 5 via a coupling 124. The couplings 124, 125 may be coupled directly to the valve 109 or to the manifold 108 in various embodiments. The manifold 108 and/or the valve 109 optionally place the supply port 402 in fluid communication with a manifold 108 or valve 109 of the neighboring subsystem 100-2 (e.g., via a coupling 123).

Continuing to refer to the illustrated subsystem 100 in more detail, in the illustrated embodiment, the drain port 403 is optionally in fluid communication with first manifold 108 of subsystem 100-1 (e.g., via a coupling 127). The manifold 108 optionally places the drain port 403 with a drain port of the control valve 109 (e.g., via a coupling 137). In various positions of the control valve 109, the valve 109 alternately receives hydraulic fluid (e.g., oil) from (1) a head end of the actuator 5 via a coupling 125 or (2) a rod end of the actuator 5 via a coupling 124. The manifold 108 and/or the valve 109 optionally place the drain port 403 in fluid communication with a manifold 108 or valve 109 of the neighboring subsystem 100-2 (e.g., via a coupling 122).

It should be appreciated that various embodiments of control subsystems may be used to control actuators 5; in some embodiments, the control subsystems may be coupled to the hydraulic system 400 in parallel and/or coupled to a single central manifold having fluid connections to each subsystem.

In some embodiments, a system controller 550 (e.g., selective control valve optionally located in the cab of the tractor) may be used to change an operating state of the system 400 (e.g., to stop, start, or modify oil pressure and/or flow).

A valve controller 500 (e.g., electrical controller, pilot pressure controller, etc.) is in communication (e.g., data communication, electrical communication, fluid communication, etc.) with each control valve 109 (which may be an electrohydraulic control valve in some embodiments) for sending command signals to change an operating state of each control valve 109. The controller 500 is optionally disposed in the cab of the tractor. In some embodiments, the controller 500 comprises a plurality of individual controllers (e.g., switches), each individual controller being configured to select a position of a corresponding control valve 109.

In operation, an operator is enabled to independently raise and lower individual row units (e.g., row units 200) of the tool by selectively actuating the individual controller 500 corresponding to an individual control valve 109. For example, when an individual row unit is passing over an area which the operator does not want to till or cultivate with the individual row unit (e.g., an area which has already been tilled, a headland, a waterway, a ditch, etc.), the operator selects a position of the individual controller 500 corresponding to the control valve 109 of that individual row unit in order to extend the actuator 5 of that row unit, raising the row unit to a raised configuration as described in more detail below.

In alternative embodiments, the controller 500 may additionally or alternatively comprise an electrical controller having a tillage prescription map stored in memory. The prescription map optionally comprises a plurality of geo-referenced coordinates (e.g., for a field or region of a field); each coordinate corresponds to a prescribed tillage action (e.g., to raise the row unit or to lower the row unit at the coordinate). The electrical controller is optionally in data communication with a global positioning system ("GPS") disposed on the tractor and/or implement for receiving GPS coordinates therefrom. The electrical controller also optionally has a plurality of GPS offsets corresponding to each row unit stored in memory such that the controller may determine a predicted location of each row unit based on the GPS coordinates. In operation, when the controller determines that the row unit has entered an area (e.g., region of a field) for which the prescription map instructs raising the row unit, the controller modifies a position of valve 109 for that row unit to raise the row unit. Once the controller determines that the row unit has left the area for which the prescription map instructs raising the row unit, the controller modifies the position of valve 109 for that row unit in order to lower the row unit.

In some embodiments, the controller 500 develops a tillage prescription map during tillage operations by recording areas of the field which have been passed over by a row unit in the lowered configuration. The tillage prescription map then contains instructions to raise any row unit passing over those areas of the field (e.g., a headland) a subsequent time. In operation, when the controller 500 determines that a row unit is passing over an area which has already been tilled, the controller raises the row unit until the area has been passed over and then lowers the row unit.

Figure 3:
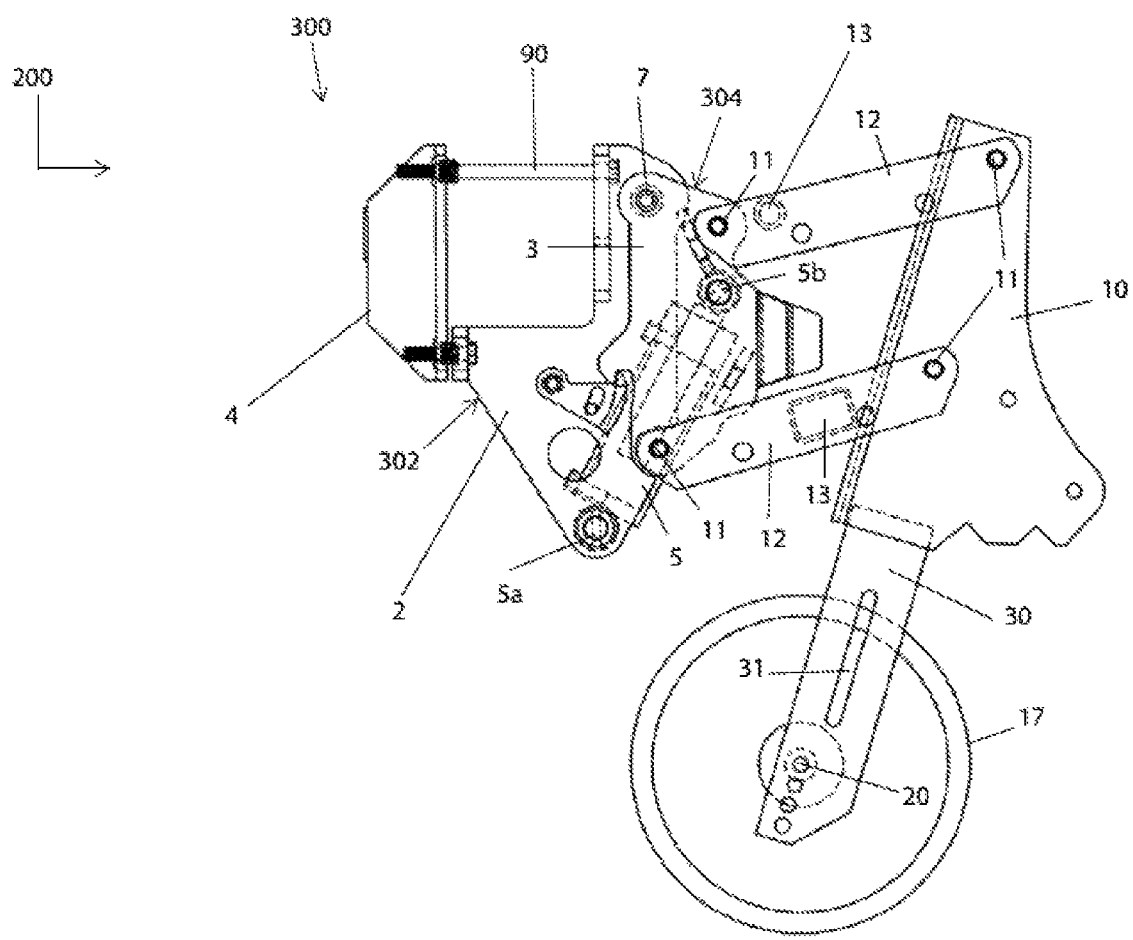
FIG. 3 is a side elevation view of a row unit in a lowered position.
Figure 4:
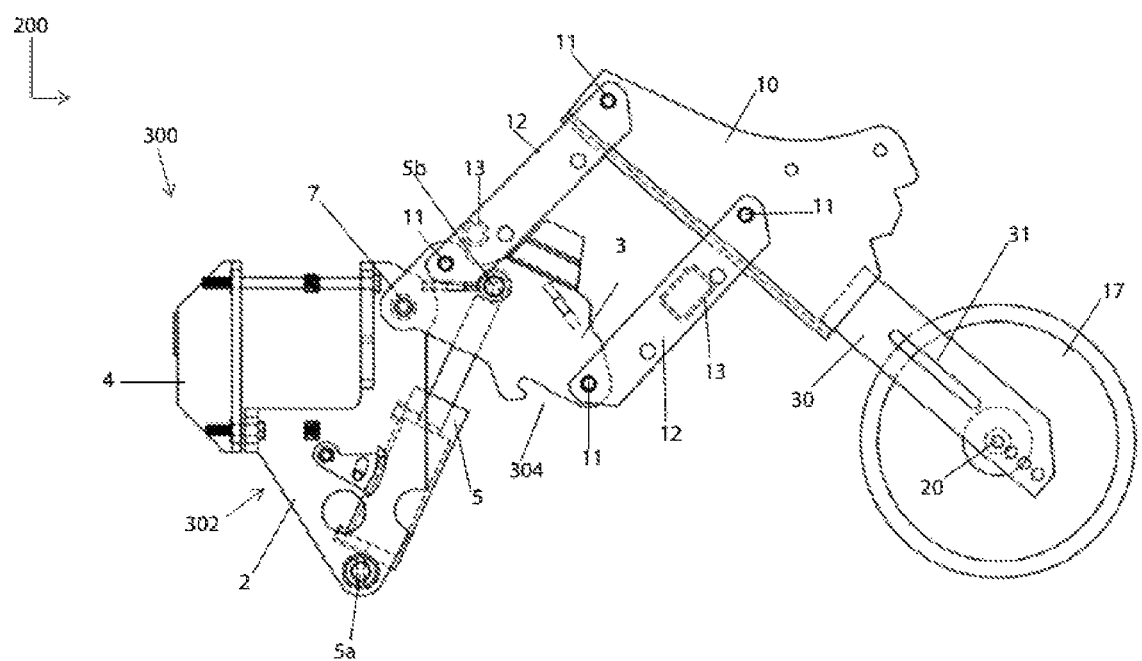
FIG. 4 is a side elevation view of the row unit of FIG. 3 in a raised position.
Figure 5:
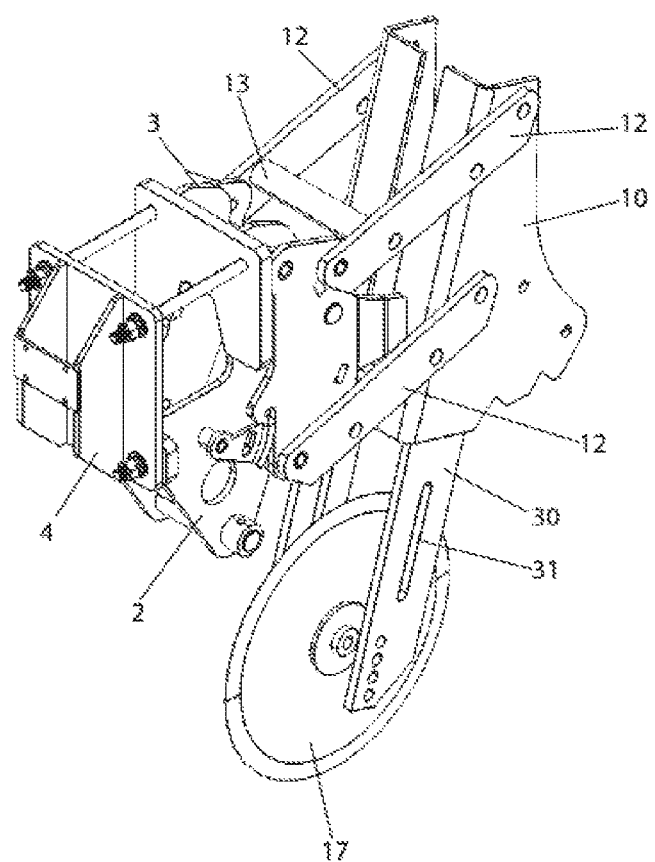
FIG. 5 is a perspective view of the row unit of FIG. 3.

Referring to FIGS. 3-4, an example embodiment of a cultivator row unit 200 is illustrated. In general, the cultivator row unit 200 is supported on a frame such as a transversely extending toolbar (not shown) by a bracket assembly 300. The row unit 200 optionally incorporates one or more ground-engaging implements 17 (herein illustrated as a coulter), which engage the soil surface in the lowered configuration of FIG. 3, but do not engage the soil surface in the raised configuration of FIG. 4. In some embodiments, one or more biasing elements (e.g., springs, actuators, etc.) may be employed to apply downpressure to the row units 200.

An actuator 5 is connected at a first attachment point 5a to a first portion 302 of the bracket assembly 300 and connected at a second attachment point 5b to a second portion 304 of the bracket assembly 300. In one embodiment, connection of the first attachment point 5a and/or the second attachment point 5b can be pivotal connections such that the actuator 5 can pivot with respect to the first portion 302 and/or the second portion 304. During operation, the actuator 5 can extend so as to move the second portion 304 away from the first portion 302 and additionally lifting implement 17 above the soil surface.

The first portion 302 of the bracket assembly 300 optionally includes one or more forward brackets 4 secured (e.g., by bolts 90) to one or more rearward brackets 2 such that the assembled brackets are removably secured to the toolbar. Additionally, one or more components of the control subsystem can be mounted to the bracket assembly 300. The mounting bracket assembly 300 optionally includes a pivotal connection 7 to which the second portion 304 is pivotally coupled. The first attachment point 5a of the actuator 5 is optionally disposed generally lower than the pivotal connection 7.

The second portion 304 includes a bracket 3 pivotally connected to the pivotal connection 7 for pivoting about a generally horizontal axis (e.g., about a central axis of the frame). The second end 5b of actuator 5 is optionally pivotally coupled to the bracket 3. Second portion 304 further includes a subframe 10 connected to the bracket 3 by a set of parallel arms 12 (e.g., four parallel arms). Each parallel arm 12 is optionally pivotally coupled at a first and second end thereof to the bracket 3 and the subframe 10, respectively, by pivotal couplings 11. In some embodiments, lateral supports 13 can be provided to connect arms 12 to one another. In some embodiments, a coulter shank 30 is mounted to the subframe 10. A coulter 17 is optionally rollingly supported at a lower end of the shank 30 (e.g., on a bearing 20).

Figure 6:
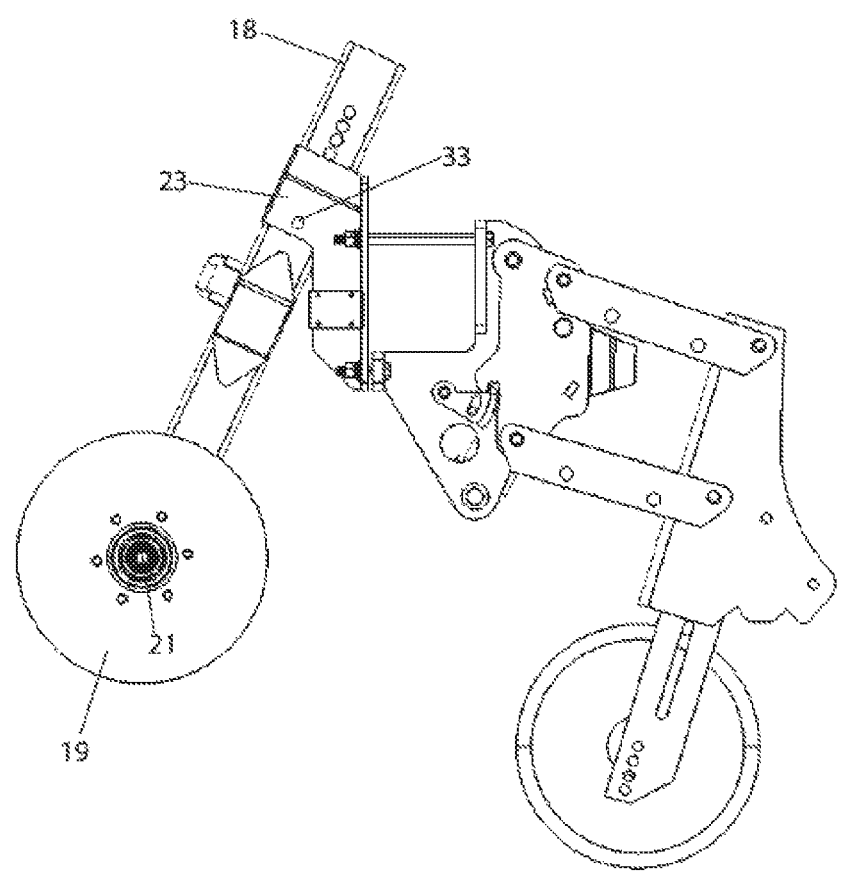
FIG. 6 is a side elevation view of a row unit having a gauge wheel.
Figure 7:
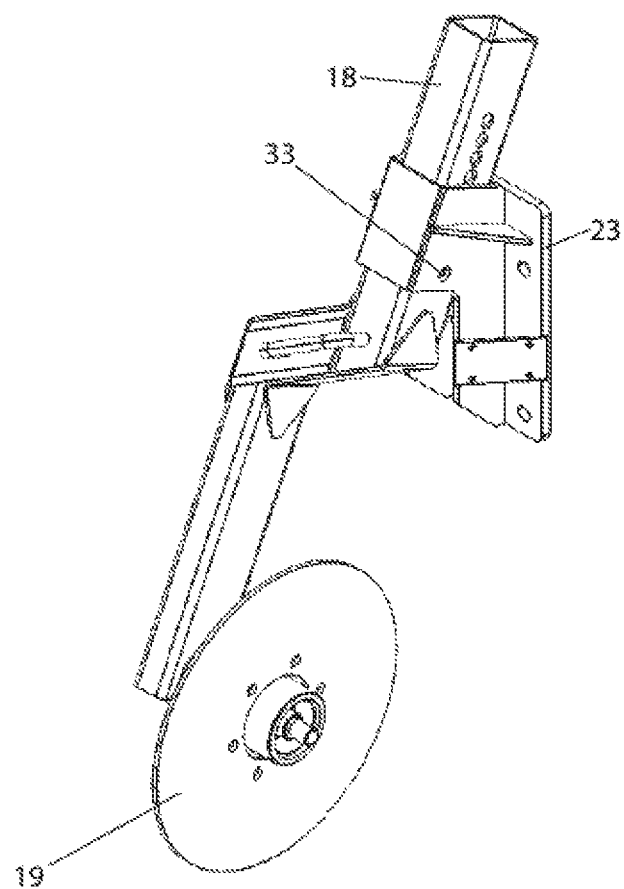
FIG. 7 is a perspective view of the gauge wheel of FIG. 5 and a mounting bracket.

As illustrated in FIGS. 6 and 7, a gauge wheel 19 is optionally additionally supported on the frame to limit the depth to which the coulter 17 extends into the ground in the lowered configuration. The gauge wheel 19 is optionally rollingly supported (e.g., on bearing 21) on a gauge wheel arm 18. The gauge wheel arm 18 is optionally adjustably coupled to a bracket 23, for example, the gauge wheel arm 18 may include a series of vertically spaced openings to mount the arm 18 with respect to a mounting hole 33 in the bracket 23 The bracket 23 can be mounted to bracket 4 or otherwise directly mounted to the frame.

Although the ground-engaging implements of the row unit 200 may vary, in some embodiments, a ripper shank is mounted to the subframe 10 and disposed to rip the soil in the lowered configuration. The ripper shank optionally includes one or more transversely extending wings (e.g., removably mounted to the shank). The ripper shank optionally includes a removable tip (e.g., wear tip) disposed at a forward end thereof.

Figure 8:
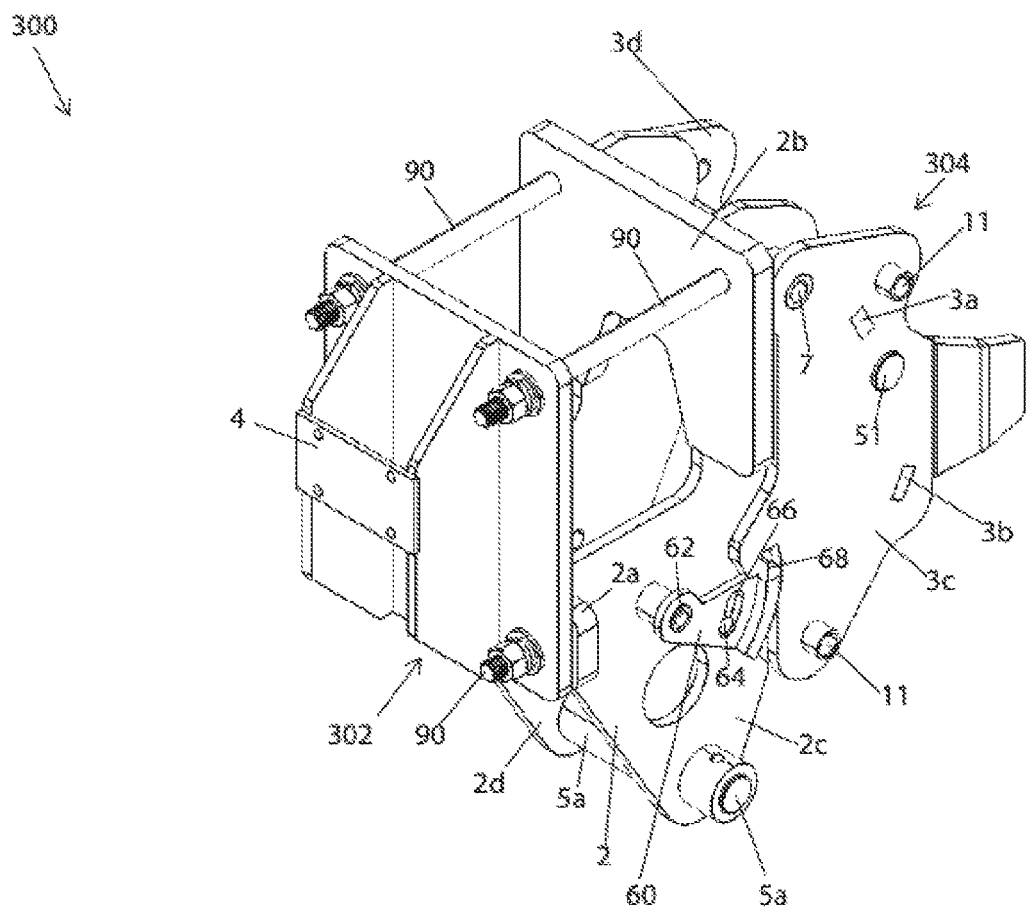
FIG. 8 is a perspective view of a bracket assembly for mounting a row unit to a frame.
Figure 9:
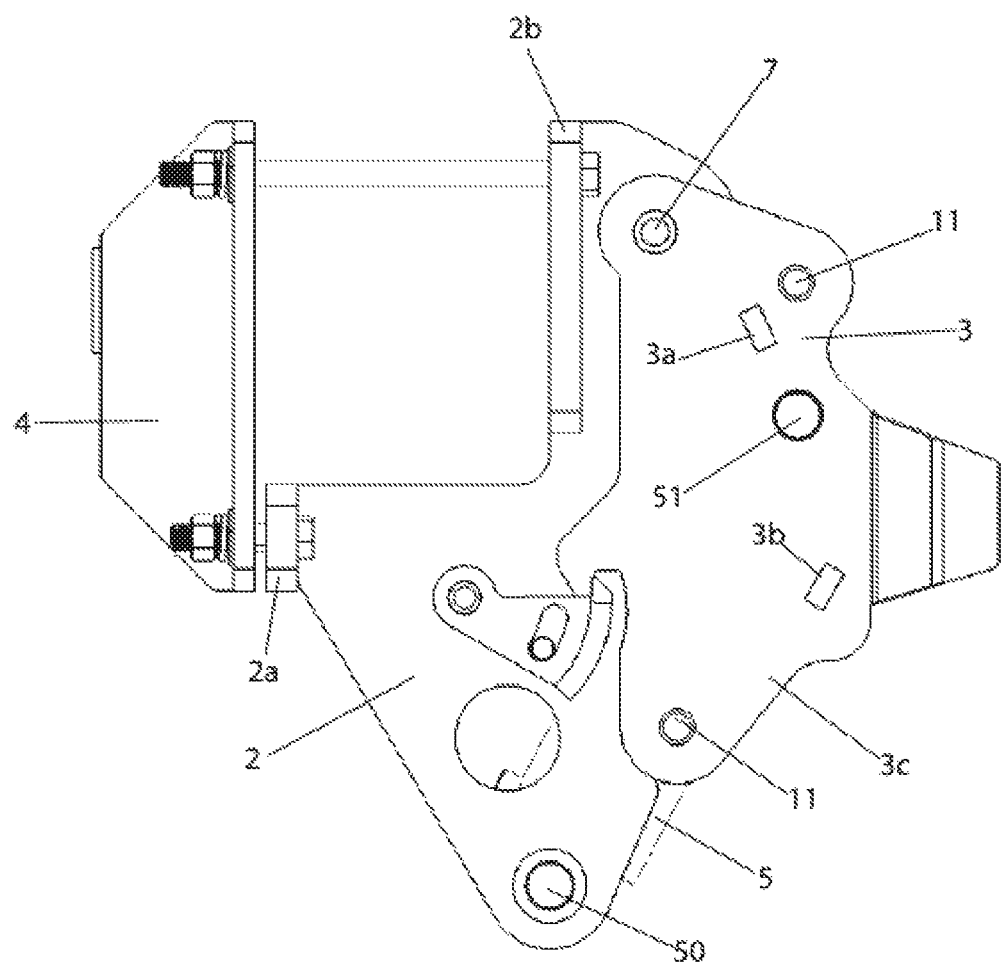
FIG. 9 is a side elevation view of the bracket assembly of FIG. 8.
Figure 10:
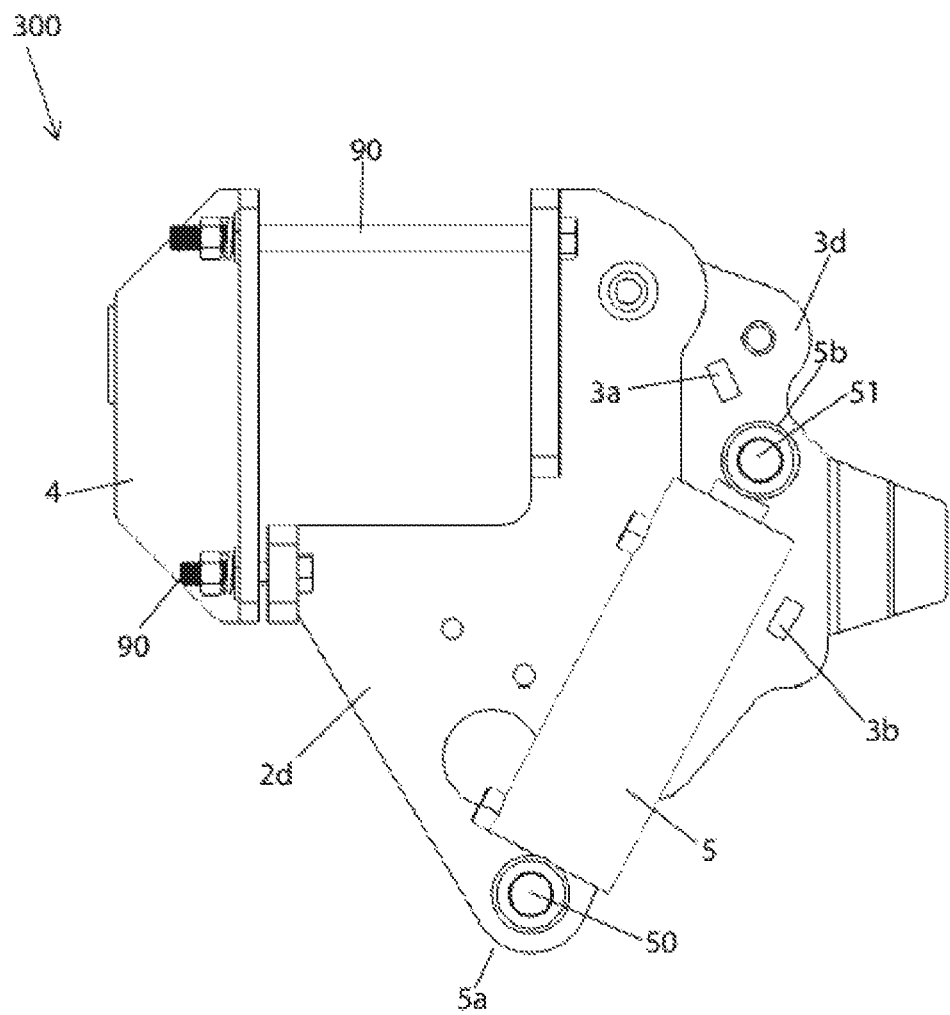
FIG. 10 is a side elevation view of the bracket assembly of FIG. 8 with portions removed.

With further reference to FIGS. 8-10, bracket assembly 300 is illustrated. Bracket 2 includes transverse portions 2a, 2b that receive fasteners 90 and spaced apart side walls 2c, 2d that support the first attachment point 5a of the actuator 5. In particular, a rod 50 extends through the side walls 2c, 2d and the first attachment point 5a to pivotally support the actuator 5 relative to bracket 2. Bracket 3 includes transverse portions 3a, 3b extending between side walls 3c, 3d. Side walls 3c, 3d support the second attachment point 5b of the actuator 5. In particular, a rod 51 extends through the side walls 3c, 3d.

Additionally, a locking portion 60 can be coupled with the bracket assembly 300 and in particular is pivotally coupled with side wall 2c about a pivot connection 62. The locking portion 60 includes a pin 64 disposed within an arcuate slot 66 and a lip 68 configured to engage side wall 3c. When in a locked position, locking portion 60 prevents relative movement of brackets 2 and 3. Alternatively, in an unlocked position, locking portion 60 does not prevent relative movement of brackets 2 and 3. In one embodiment, the locking portion 60 is moved between the locked position and unlocked position based on gravity moving the locking portion 60 relative to the pivot connection 62.

Figure 11:
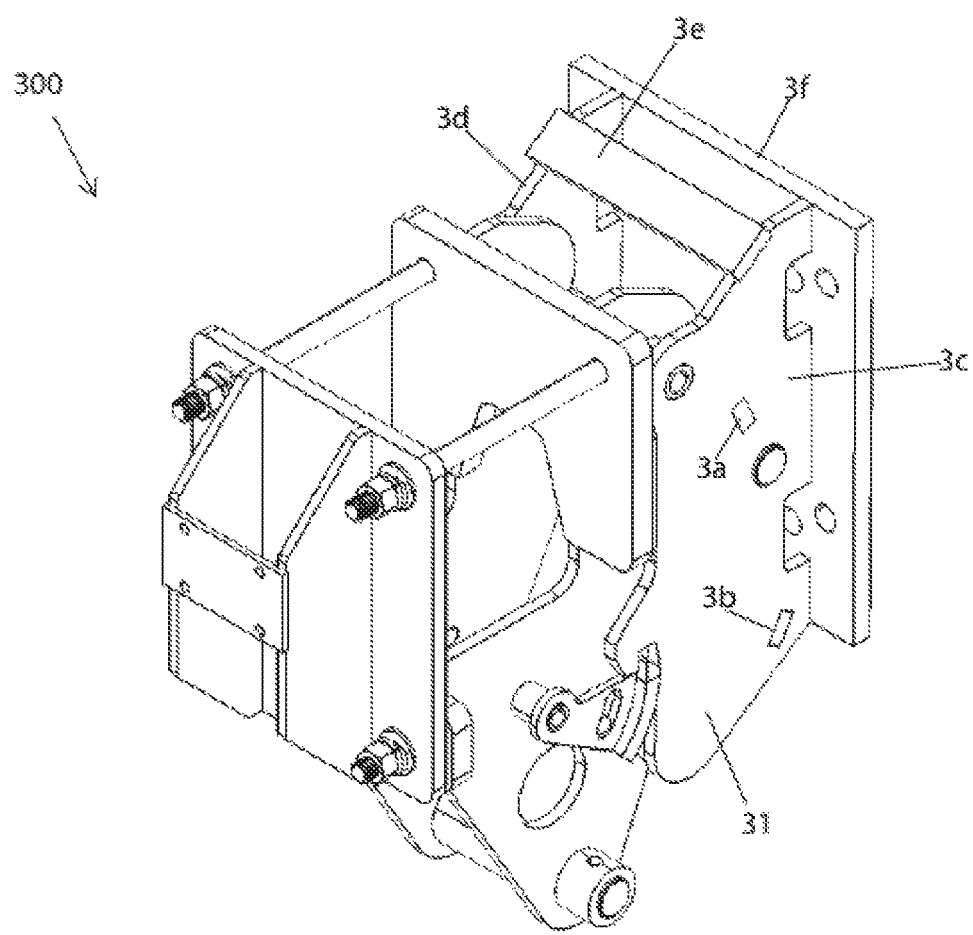
FIG. 11 is a perspective view of an alternative bracket assembly for mounting a row unit to a frame.
Figure 12:
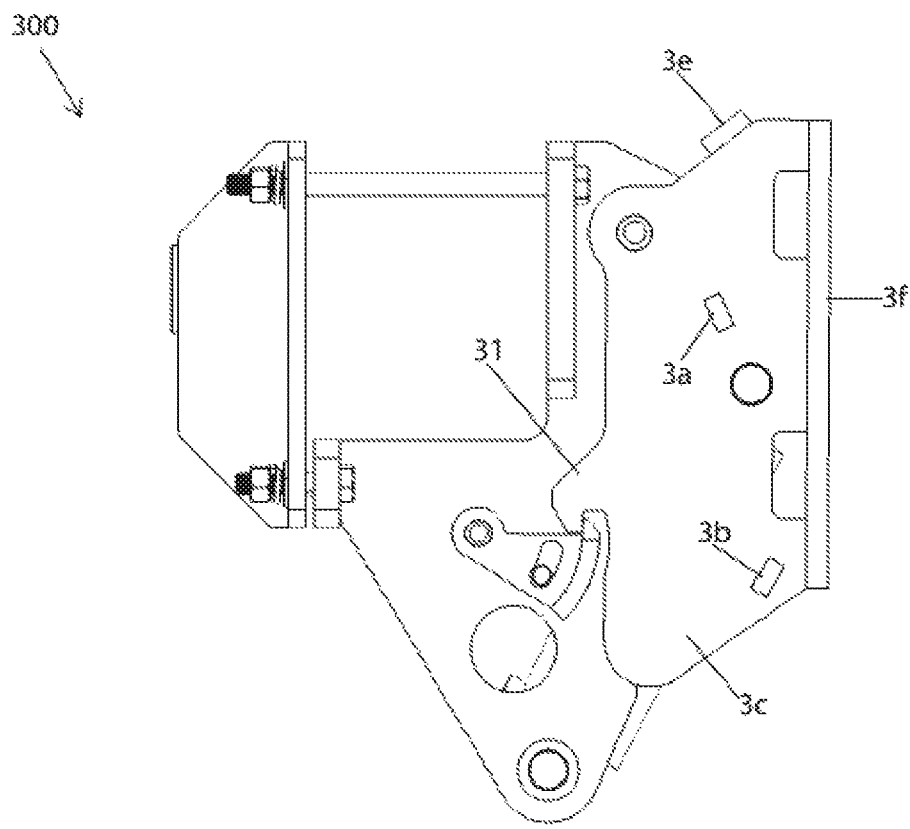
FIG. 12 is a side elevation view of the bracket assembly of FIG. 11.

FIGS. 11-12 illustrate an alternative bracket assembly 300' that includes an alternative bracket 3'. The bracket 3' includes an additional transverse wall 3e and a rear wall 3f.

Figure 13:
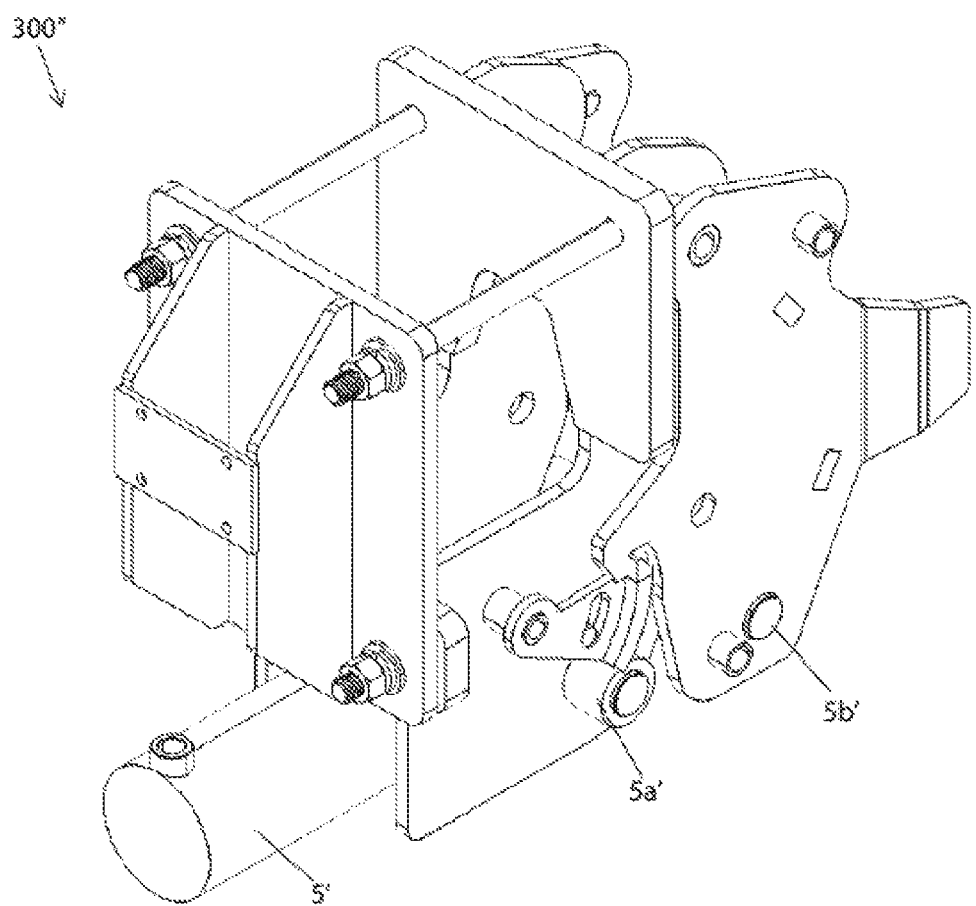
FIG. 13 is a perspective view of an alternative bracket assembly for mounting a row unit to a frame.
Figure 14:
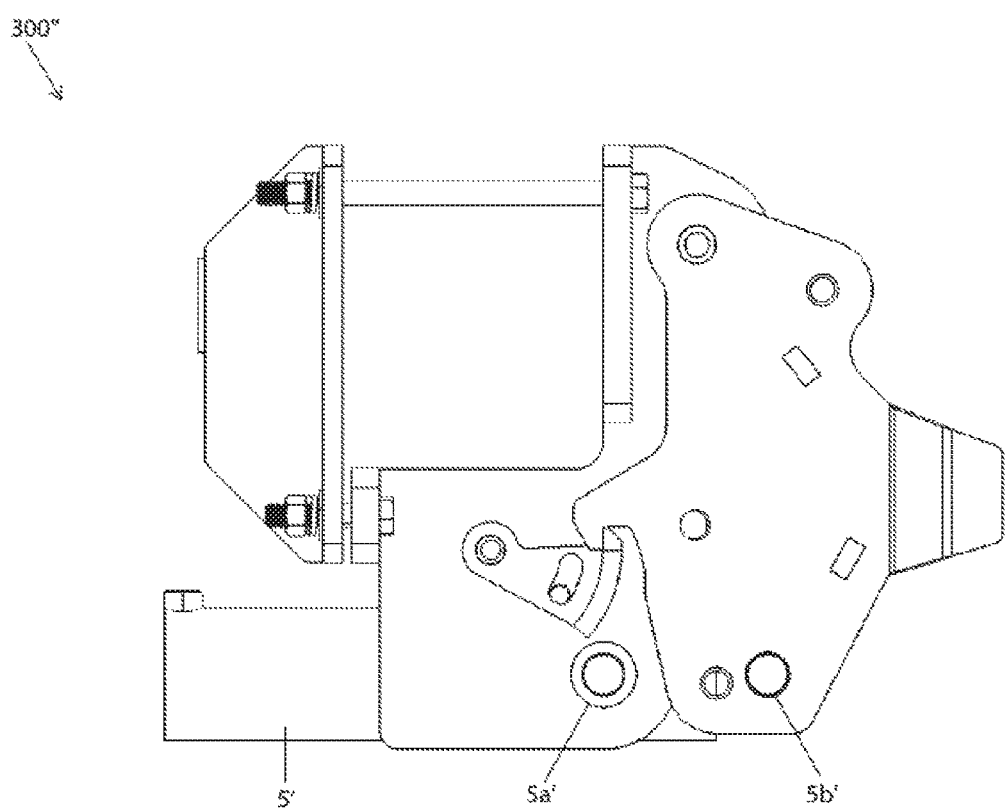
FIG. 14 is a side elevation view of the bracket assembly of FIG. 13.

FIGS. 13-14 illustrate an alternative bracket assembly 300" that includes an alternative actuator 5' having attachment points 5a' and 5b' positioned closer to one another and wherein actuator 5' is oriented generally horizontal. Upon extension of the actuator 5' a main body portion of the actuator 5' pivots about the attachment point 5a'.

In some embodiments, the row unit 200 may have common features or functionality with one or more embodiments disclosed in U.S. Pat. No. 4,834,189, incorporated by reference herein. In some embodiments, the control system 700 may have common features or functionality with one or more embodiments disclosed in U.S. Pat. No. 6,698,523, incorporated by reference herein.

Headings used herein are simply for convenience of the reader and are not intended to be understood as limiting or used for any other purpose. Any ranges recited herein are intended to inclusively recite all values within the range provided in addition to the maximum and minimum range values.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A tillage control system for a plurality of row units having an implement and being connected to a frame, comprising:
    a hydraulic system having fluid, a supply port and a drain port;
    a plurality of control subsystems fluidly coupled with the supply port and the drain port, each control subsystem coupled with one of the plurality of row units to move an implement between a lowered and raised position relative to ground when in operation, each control subsystem comprising:
        a bracket assembly having a first portion and a second portion, the first portion connected to the frame and the second portion coupled to the first portion at a pivot connection;
        a control valve;
        an actuator fluidly coupled to the control valve, each actuator defining a body portion and having a first attachment point coupled with the first portion and a second attachment point coupled with the second portion, the first attachment point and the second attachment point positioned closer to ground than the pivot connection when the implement is in the lowered position, wherein a distance from the first attachment point to the second attachment point is less than a length of the body portion in the lowered position of the implement; and
    a controller, wherein the controller is communicatively coupled with each of the control valves to independently operate each actuator to raise and lower each implement of the plurality of row units relative to the frame, wherein, upon operation of each actuator to move the implement to the raised position, the second attachment point pivots about the pivot connection and moves away from the first attachment point.

2. The tillage control system of claim 1, wherein the controller is configured to access memory defining a plurality of prescribed tillage actions for each of a plurality of geo-referenced coordinates and operates to raise and lower each implement as a function of the plurality of prescribed tillage actions.

3. The tillage control system of claim 1, wherein the hydraulic system further includes a pressure release valve.

4. The tillage control system of claim 1, wherein the second attachment point is positioned above the first attachment point and the pivot connection in the raised position of the implement.

5. The tillage control system of claim 1, wherein, during operation, a line connecting the first attachment point to the second attachment point is horizontal.

6. The tillage control system of claim 1, wherein the body portion pivots relative to the pivot connection and the first attachment point upon extension of the actuator.

7. A tillage apparatus, comprising:
    a frame;
    a plurality of row units coupled to the frame, each row unit comprising:
        a bracket assembly having a first portion and a second portion connected to the first portion at a pivot connection, the first portion mounted to the frame and the second portion coupled with the first portion to move an implement between a lowered and raised position relative to ground when in operation;
        a hydraulic actuator defining a body portion and having a first attachment point coupled with the first portion and a second attachment point coupled with the second portion, the first attachment point and the second attachment point positioned closer to ground than the pivot connection when the implement is in the lowered position, wherein a distance from the first attachment point to the second attachment point is less than a length of the body portion in the lowered position of the implement; and
        a subframe connected to the second portion and supporting an implement, wherein upon extension of the actuator, the subframe moves relative to the frame and the second attachment point pivots about the pivot connection and moves away from the first attachment point; and
    a control system including a plurality of control subsystems coupled with each hydraulic actuator of the plurality of row units and configured to independently operate each actuator to raise and lower each implement relative to the frame.

8. The tillage apparatus of claim 7, wherein each second portion includes a bracket and spaced apart arms connecting the bracket with the subframe, the spaced apart arms configured to pivot relative to the bracket upon extension of the respective actuator.

9. The tillage apparatus of claim 7, wherein each of the plurality of row units includes a gauge wheel coupled with the frame, the gauge wheel positioned on a side of the frame opposite the subframe.

10. The tillage apparatus of claim 7, wherein each bracket assembly includes a locking portion that can be positioned to prevent movement of the first portion relative to the second portion.

11. The tillage apparatus of claim 7, wherein the second attachment point is positioned above the first attachment point and the pivot connection in the raised position of the implement.

12. The tillage apparatus of claim 7, wherein, during operation, a line connecting the first attachment point to the second attachment point is horizontal.

13. The tillage apparatus of claim 7, wherein the body portion pivots relative to the pivot connection and the first attachment point upon extension of the actuator.

* * * * *